United States Patent
Chen et al.

(10) Patent No.: US 11,573,438 B2
(45) Date of Patent: Feb. 7, 2023

(54) ELECTRICALLY CONTROLLED VIEWING ANGLE SWITCHING DEVICE AND DISPLAY DEVICE

(71) Applicant: Coretronic Corporation, Hsin-Chu (TW)

(72) Inventors: Ping-Yen Chen, Hsin-Chu (TW); Chung-Yang Fang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/234,809

(22) Filed: Apr. 20, 2021

(65) Prior Publication Data
US 2021/0333578 A1  Oct. 28, 2021

(30) Foreign Application Priority Data
Apr. 23, 2020 (CN) .......................... 202020624244.8

(51) Int. Cl.
*G02F 1/13* (2006.01)
*G02F 1/1347* (2006.01)

(52) U.S. Cl.
CPC ........ *G02F 1/1323* (2013.01); *G02F 1/13475* (2013.01)

(58) Field of Classification Search
CPC . G02F 1/1323; G02F 1/13475; G02F 1/13725
See application file for complete search history.

(56) References Cited

U.S. PATENT DOCUMENTS

| 5,194,973 A * | 3/1993 | Isogai | G02F 1/1334 349/10 |
| 10,649,248 B1 * | 5/2020 | Fan Jiang | H04N 7/141 |
| 2020/0026114 A1 * | 1/2020 | Harrold | G02F 1/1323 |

FOREIGN PATENT DOCUMENTS

| CN | 109343241 A | * | 2/2019 | ............. G02B 30/27 |
| CN | 110133882 | | 8/2019 | |
| CN | 111948839 A | * | 11/2020 | |
| CN | 111965863 A | * | 11/2020 | |
| GB | 2418518 A | * | 3/2006 | ......... G02F 1/13475 |
| KR | 20200040082 A | * | 4/2020 | |

* cited by examiner

*Primary Examiner* — Alexander P Gross
(74) *Attorney, Agent, or Firm* — JCIPRNET

(57) ABSTRACT

An electrically controlled viewing angle switching device including a first electrode, a second electrode, a liquid crystal layer, multiple dye molecules, and a polarizer is provided. The second electrode is disposed opposite to the first electrode. The liquid crystal layer is disposed between the first electrode and the second electrode and has an optical axis. The dye molecules are dispersedly disposed in the liquid crystal layer. Each of the dye molecules is arranged corresponding to the optical axis of the liquid crystal layer. The polarizer is stacked on the liquid crystal layer. The axial direction of the optical axis of the liquid crystal layer is perpendicular to the axial direction of the transmission axis of the polarizer. A display device using the electrically controlled viewing angle switching device is also provided.

10 Claims, 5 Drawing Sheets

ELECTRICALLY CONTROLLED VIEWING ANGLE SWITCHING DEVICE AND DISPLAY DEVICE

CROSS-REFERENCE TO RELATED APPLICATION

This application claims the priority benefit of China application serial no. 202020624244.8, filed on Apr. 23, 2020. The entirety of the above-mentioned patent application is hereby incorporated by reference herein and made a part of this specification.

BACKGROUND OF THE DISCLOSURE

Technical Field

The disclosure relates to a viewing angle switching device and a display device, and particularly relates to an electrically controlled viewing angle switching device and a display device.

Description of Related Art

Generally speaking, for multiple viewers to watch a display device together, a display device usually has a wide viewing angle display function. However, in certain situations or occasions, such as browsing private web pages, confidential information, or entering passwords in a public place, the wide viewing angle display function is likely to cause the leakage of confidential information because the display screen can be easily peeped by others. To achieve the anti-peeping effect, a general practice is to place a light control film (LCF) in front of the display panel to filter out light at a large angle. Conversely, when the anti-peeping function is not required, the light control film is manually removed from the front of the display panel. In other words, although such a light control film has an anti-peeping effect, there is still room for improvement in facilitating its operation. Therefore, how to develop a display device with extremely convenient viewing angle switching function and excellent anti-peeping effect has become an important issue for related manufacturers.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY OF THE DISCLOSURE

The disclosure provides an electrically controlled viewing angle switching device, which has a better filter effect at the side viewing angle.

The disclosure provides a display device with good anti-peeping performance at a side viewing angle.

In order to achieve one or part of or all of the features, an embodiment of the disclosure provides an electrically controlled viewing angle switching device. The electrically controlled viewing angle switching device includes a first electrode, a second electrode, a liquid crystal layer, and a plurality of dye molecules and a polarizer. The second electrode is disposed opposite to the first electrode. The liquid crystal layer is disposed between the first electrode and the second electrode, and has an optical axis. The dye molecules are dispersedly disposed in the liquid crystal layer. Each of the dye molecules is arranged corresponding to the optical axis of the liquid crystal layer. The polarizer is stacked on the liquid crystal layer. An axial direction of the optical axis of the liquid crystal layer is perpendicular to an axial direction of a transmission axis of the polarizer.

In order to achieve one or part of or all of the features, an embodiment of the disclosure provides a display device. The display device includes a display panel and an electrically controlled viewing angle switching device. The electrically controlled viewing angle switching device is stacked on the display panel and includes a first electrode, a second electrode, a liquid crystal layer, a plurality of dye molecules, and a polarizer. The second electrode is disposed opposite to the first electrode. The liquid crystal layer is disposed between the first electrode and the second electrode and has an optical axis. The dye molecules are dispersedly disposed in the liquid crystal layer. Each of the dye molecules is arranged corresponding to the optical axis of the liquid crystal layer. The polarizer is disposed between the electrically controlled viewing angle switching device and the display panel. The axial direction of the optical axis of the liquid crystal layer is perpendicular to the axial direction of the transmission axis of the polarizer.

Based on the above, in the electrically controlled viewing angle switching device and the display device according to embodiments of the disclosure, the plurality of dye molecules are provided in the liquid crystal layer disposed between the first electrode and the second electrode. Both the axial direction of the optical axis of the liquid crystal layer and the axial direction of the absorption axis of the dye molecules are perpendicular to the axial direction of the transmission axis of the polarizer; in this manner, the light filtering function of the electrically controlled viewing angle switching device at the side viewing angle can be effectively improved. On the other hand, adjusting the axial direction of the absorption axis of the dye molecules by electrical control can make switching the display device between the sharing mode and the anti-peeping mode more convenient.

Other objectives, features and advantages of the disclosure will be further understood from the further technological features disclosed by the embodiments of the disclosure wherein there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the Figure(s) being described. The components of the disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
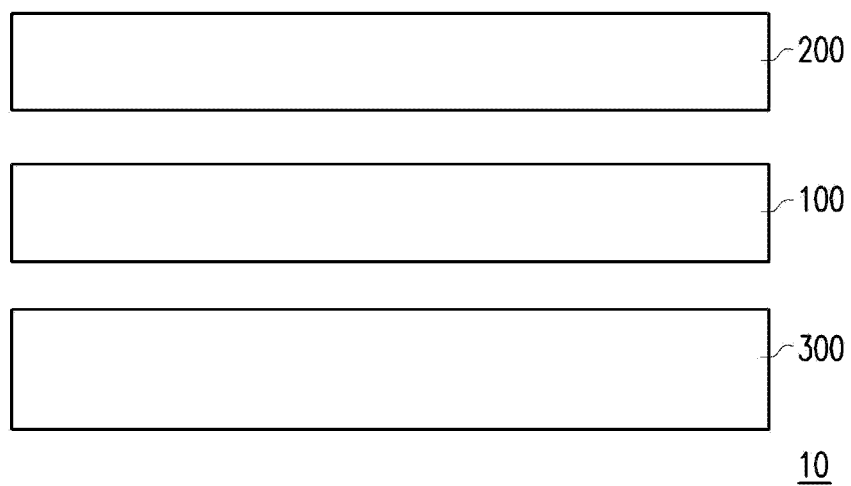
FIG. 1 is a schematic side view of a display device according to an embodiment of the disclosure.
Figure 2A:
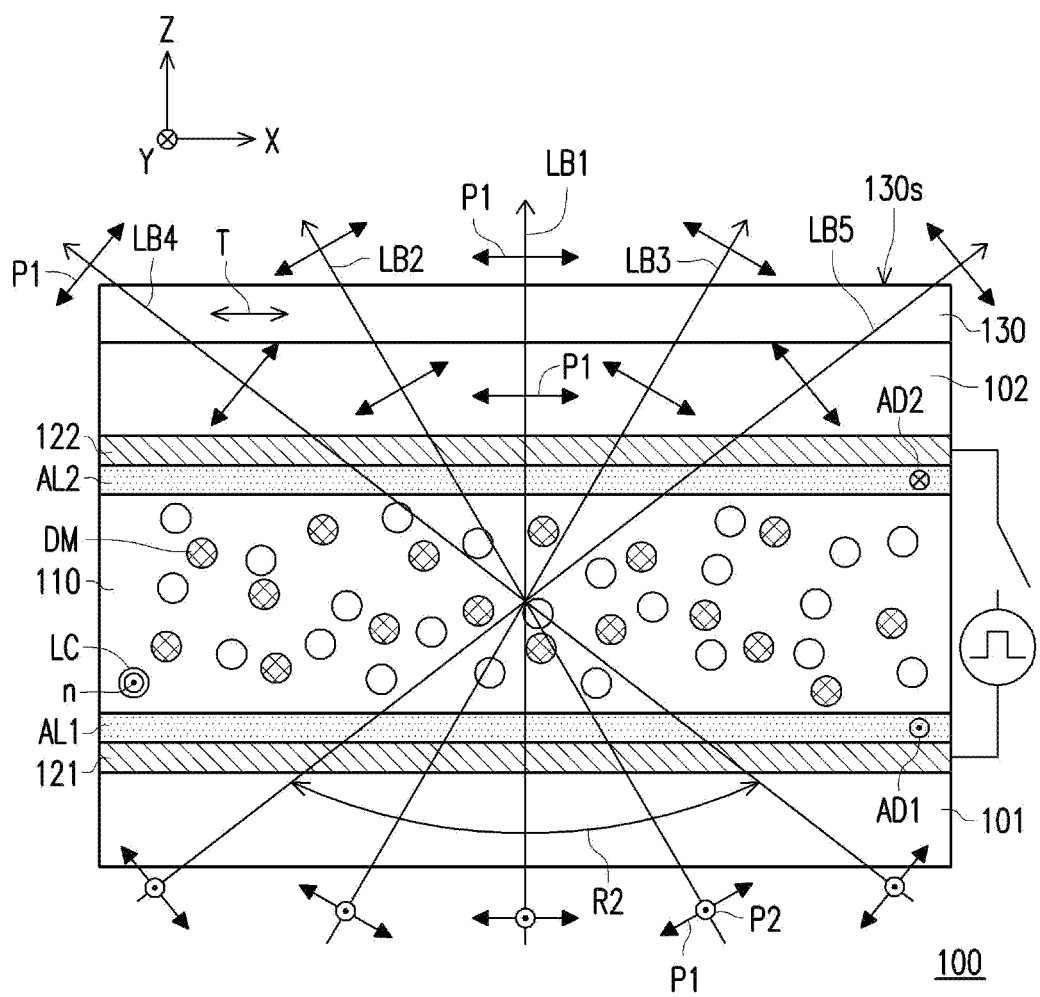
FIG. 2A and FIG. 2B are schematic cross-sectional views showing different cross-sections of the electrically controlled viewing angle switching device of FIG. 1 operating in a sharing mode.
Figure 2B:
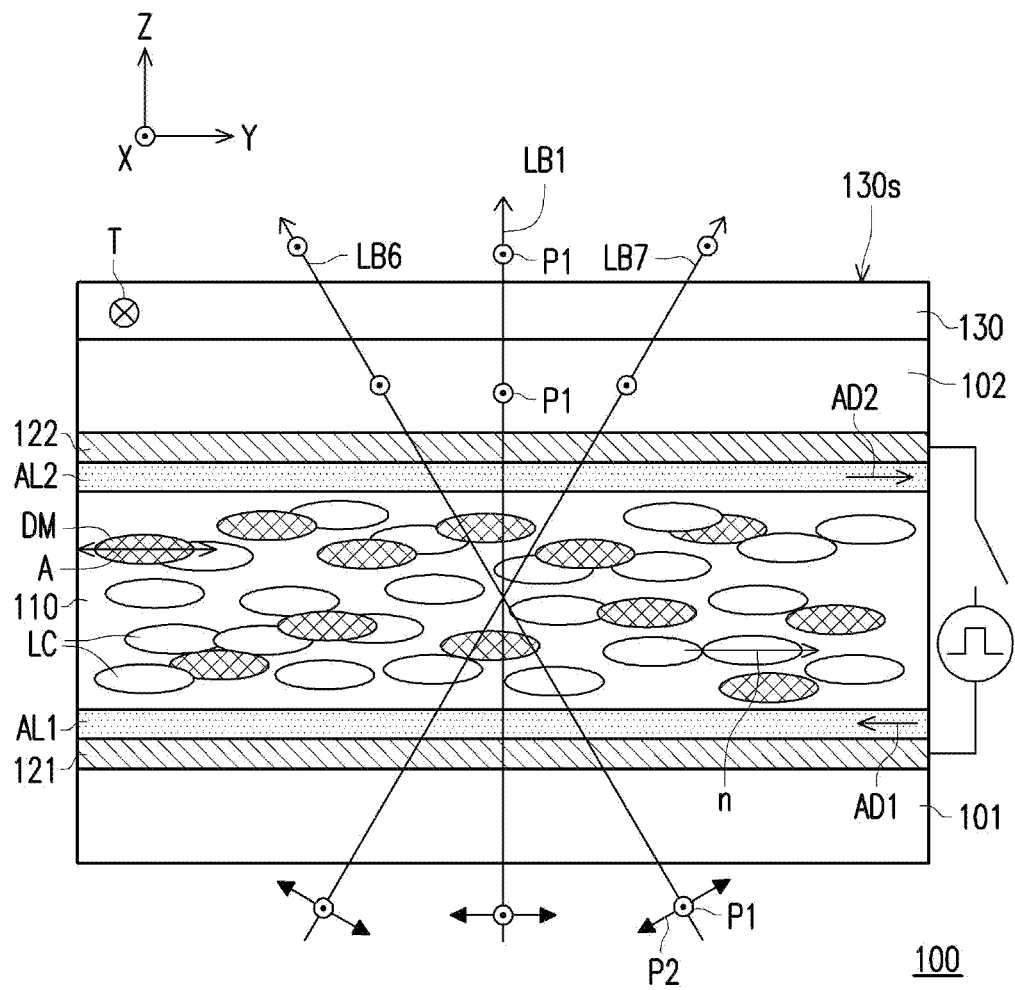
Figure 3A:
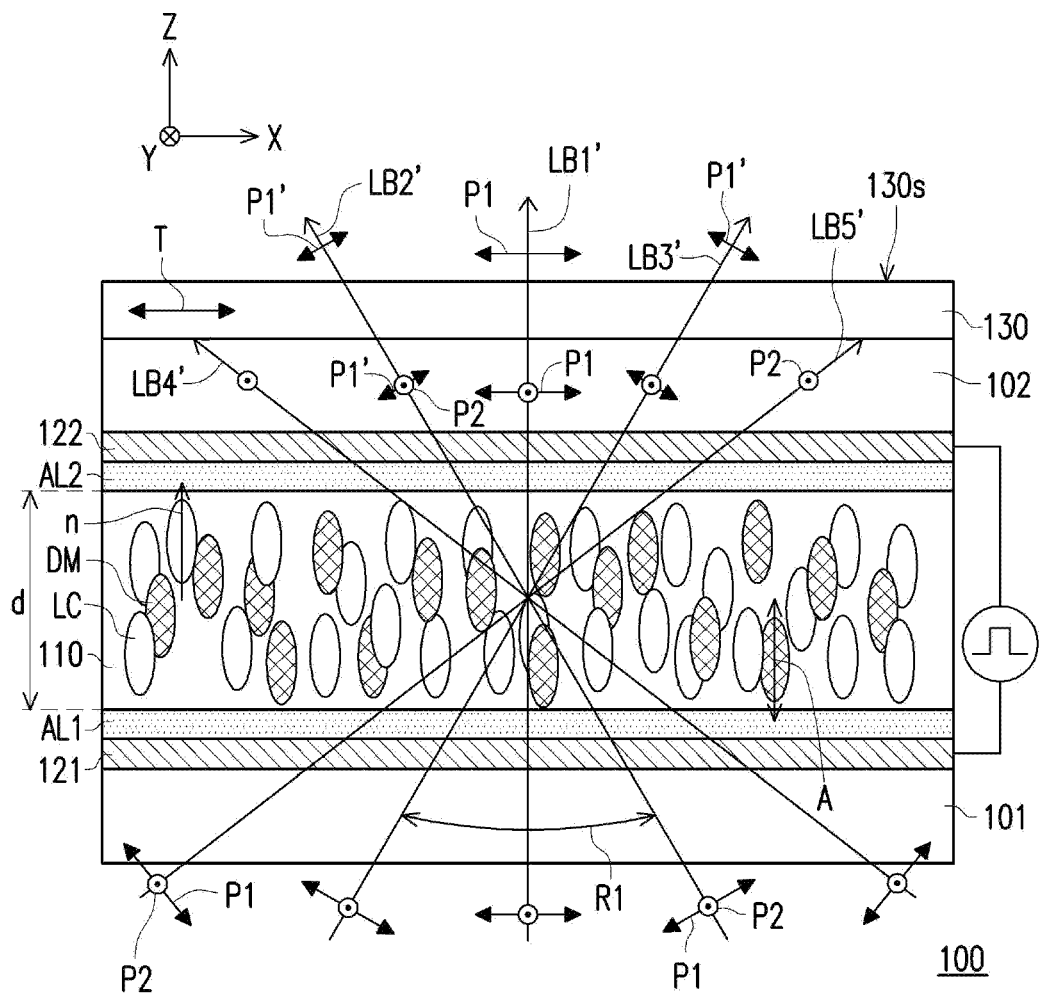
FIG. 3A and FIG. 3B are schematic cross-sectional views showing different cross-sections of the electrically controlled viewing angle switching device of FIG. 1 operating in an anti-peeping mode.
Figure 3B:
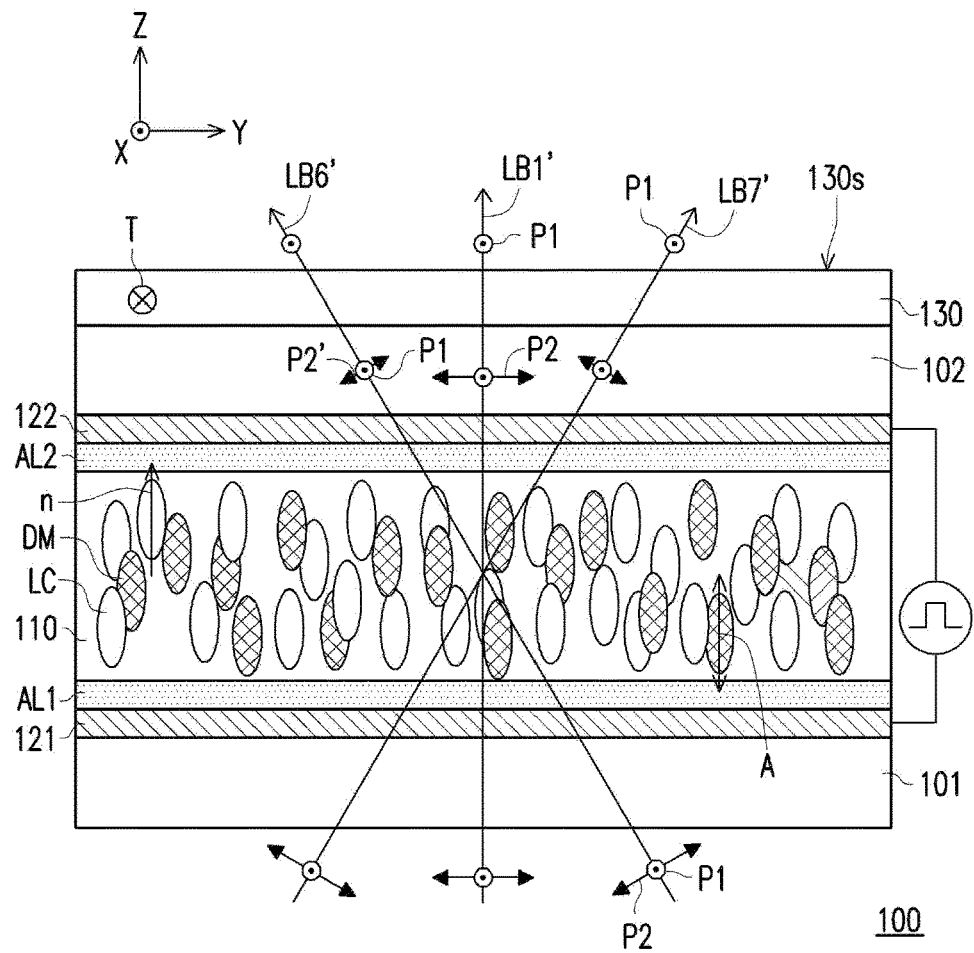

FIG. 1 is a schematic side view of a display device according to an embodiment of the disclosure. FIG. 2A and FIG. 2B are schematic cross-sectional views showing different cross-sections of the electrically controlled viewing angle switching device of FIG. 1 operating in a sharing mode. FIG. 3A and FIG. 3B are schematic cross-sectional views showing different cross-sections of the electrically controlled viewing angle switching device of FIG. 1 operating in an anti-peeping mode. Referring to FIG. 1, a display device 10 includes an electrically controlled viewing angle switching device 100 and a display panel 200. The electrically controlled viewing angle switching device 100 is stacked on the display panel 200. In the embodiment, the display panel 200 is a non-self-luminous display panel, such as a liquid crystal display panel. For example, the display panel 200 may include a liquid crystal layer (not shown), two electrode layers (not shown), and two polarizers (not shown). The two electrode layers are disposed between the two polarizers, and the liquid crystal layer is disposed between the two electrode layers. When the display panel 200 is enabled, a voltage is applied between the two electrode layers to form an electric field, and this electric field can drive a plurality of liquid crystal molecules of the liquid crystal layer to rotate to form an optical axis arrangement corresponding to the magnitude of the electric field. On this occasion, the optical axis arrangement of the liquid crystal layer is suitable for modulating the polarization state of the incident light so that the incident light has a corresponding light intensity after passing through the polarizer to achieve the effect of gray-scale display.

It should be understood that since the display panel 200 is a non-self-luminous display panel, the display device 10 may also optionally include a backlight module 300. The backlight module can be a general backlight module with multiple brightness enhancement films (such as 3M BEF, not shown) and a diffusion film (not shown), or a condensing type backlight module using a reverse prism lens (such as DNP W528, not shown), wherein the electrically controlled viewing angle switching device 100 is disposed between the display panel 200 and the backlight module 300. However, the disclosure is not limited thereto. In other embodiments, the electrically controlled viewing angle switching device 100 may be disposed above the display panel 200. That is, the display panel 200 is disposed between the electrically controlled viewing angle switching device 100 and the backlight module 300. Note that, the display panel 200 of the display device 10 of the disclosure may also be an organic light-emitting diode (OLED) panel, a micro light-emitting diode (Micro LED) panel, or other suitable self-luminous display panels without additional configuration of the backlight module 300. Moreover, the electrically controlled viewing angle switching device 100 is disposed on the light exit side of the display panel (self-luminous display panel).

Referring to FIG. 2A and FIG. 2B, the electrically controlled viewing angle switching device 100 includes a liquid crystal layer 110, a plurality of dye molecules DM, a polarizer 130, a first electrode 121 and a second electrode 122 and may optionally include a first substrate 101 and a second substrate 102. The first electrode 121 and the second electrode 122 that are opposite to each other are respectively disposed on the first substrate 101 and the second substrate 102. The first electrode 121 and the second electrode 122 are, for example, a complete electrode layer (e.g., planar electrode layer). The liquid crystal layer 110 is disposed between the first electrode 121 and the second electrode 122 and includes a plurality of liquid crystal molecules LC. The liquid crystal layer 110 has an optical axis n. For example, each of the liquid crystal molecules LC has an optical axis n, and the optical axes n of the liquid crystal molecules LC are arranged substantially in the same direction, that is, the optical axis n of the liquid crystal layer 110. For example, when a voltage is applied between the first electrode 121 and the second electrode 122, this voltage can form an electric field between the two electrodes and drive the liquid crystal molecules LC of the liquid crystal layer 110 to rotate. In other words, with the magnitudes and distributions of different electric fields, the optical axis n of the plurality of liquid crystal molecules LC can be changed and arranged substantially in the same direction so as to adjust the light output amount (or transmittance) of the electrically controlled viewing angle switching device 100 at different viewing angles. Furthermore, the display device 10 can be switched between the sharing mode and the anti-peeping mode.

In the embodiment, materials of the first substrate 101 and the second substrate 102 include glass, quartz, organic polymer, or other suitable transparent materials. On the other hand, the first electrode 121 and the second electrode 122 are, for example, light transmissive electrodes. Materials of the light transmissive electrode include indium tin oxide, indium zinc oxide, aluminum tin oxide, aluminum zinc oxide, or other suitable oxides, ultra-thin metals, metal mesh or wire grids, carbon nanotubes, Ag nano-wires, graphene, or stacked layers of at least two of the above.

On the other hand, in order to allow the optical axis n of the plurality of liquid crystal molecules LC of the liquid crystal layer 110 to be arranged in a specific direction without additionally applying an electric field (that is, when no voltage is applied between the two electrodes), the electrically controlled viewing angle switching device 100 also optionally includes a first alignment film AL1 and a second alignment film AL2. The first alignment film AL1 is disposed between the first electrode 121 and the liquid crystal layer 110. The second alignment film AL2 is disposed between the second electrode 122 and the liquid crystal layer 110. The liquid crystal layer 110 is sandwiched between the first alignment film AL1 and the second alignment film AL2. For example, the first alignment film AL1 and the second alignment film AL2 respectively have a first alignment direction AD1 and a second alignment direction AD2, and the first alignment direction AD1 is, for example, opposite to the second alignment direction AD2. That is, the alignment direction AD1 of the first alignment film AL1 is anti-parallel to the alignment direction AD2 of the second alignment film AL2. For example, in the embodiment, the axial direction of the optical axis n (or longitudinal axis) of the plurality of liquid crystal molecules LC of the liquid crystal layer 110 can be parallel to the alignment direction AD1 (i.e., direction Y) of the first alignment film AL1 and the alignment direction AD2 (i.e., direction Y) of the second alignment films AL2 without additionally applying an electric field. More specifically, the liquid crystal molecules LC of the liquid crystal layer 110 are not arranged between the two alignment films in a twist deformation manner.

Further, please continue to refer to FIG. 2A and FIG. 2B. The dye molecules DM of the electrically controlled viewing angle switching device 100 are dispersedly disposed in the liquid crystal layer 110, and each of the dye molecules DM is arranged corresponding to the optical axis n of the plurality of liquid crystal molecules LC. Each of the dye molecules DM has an absorption axis A (shown in FIG. 2B), and the axial direction of the absorption axis A is substantially parallel to the axial direction of the optical axis n of the liquid crystal molecules LC. More specifically, the liquid crystal molecules LC can drive the dye molecules DM to rotate together when an electric field is applied (e.g., when a voltage is applied between the first electrode 121 and the second electrode 122).

In the embodiment, the polarizer 130 of the electrically controlled viewing angle switching device 100 is stacked on the liquid crystal layer 110. For example, the polarizer 130 can be attached to a lateral surface of the second substrate 102 away from the liquid crystal layer 110, and a surface 130s of the polarizer 130 away from the second substrate 102 can define a light exit surface of the electrically controlled viewing angle switching device 100. However, in other embodiments, the polarizer 130 may be defined as a light incident surface of the electrically controlled viewing angle switching device 100. Note that, when the electrically controlled viewing angle switching device 100 of the embodiment is applied to a display device (as shown in FIG. 1), if the display panel 200 is a liquid crystal display panel and the electrically controlled viewing angle switching device 100 is disposed between the display panel 200 and the backlight modules 300, because the polarizer 130 is disposed on the light exit surface of the electrically controlled viewing angle switching device 100, that is, the polarizer 130 is disposed between the liquid crystal layer 110 and the display panel 200, the polarizer on one side of the liquid crystal display panel close to the electrically controlled viewing angle switching device 100 can also be configured to replace the polarizer 130 of the electrically controlled viewing angle switching device 100. That is, the electrically controlled viewing angle switching device 100 and the display panel 200 can share the same polarizer, and the polarizer is located between the liquid crystal layer 110 of the electrically controlled viewing angle switching device 100 and the display panel 200. In other words, the polarizer 130 of the electrically controlled viewing angle switching device 100 may be provided by the display panel 200, and the electrically controlled viewing angle switching device 100 may not include the polarizer 130. However, the disclosure is not limited thereto. In other embodiments, the display panel 200 is disposed between the electrically controlled viewing angle switching device 100 and the backlight module 300, and the polarizer 130 may be disposed on the light incident surface of the electrically controlled viewing angle switching device 100. In this way, the polarizer on one side of the liquid crystal display panel close to the electrically controlled viewing angle switching device 100 can also be configured to replace the polarizer 130 of the electrically controlled viewing angle switching device 100. In another embodiment, the polarizer 130 may be disposed on one side of the electrically controlled viewing angle switching device 100 away from the display panel 200. For example, the electrically controlled viewing angle switching device 100 is disposed between the display panel 200 and the backlight module 300, and the polarizer 130 may be disposed on the light incident surface of the electrically controlled viewing angle switching device 100; or the display panel 200 is disposed between the electrically controlled viewing angle switching device 100 and the backlight module 300, and the polarizer 130 may be disposed on the light exit surface of the electrically controlled viewing angle switching device 100. Note that, the electrically controlled viewing angle switching device 100 of the embodiment only needs to be provided with one polarizer, and the viewing angle control performance can be achieved without attaching polarizers on the outer surfaces of the substrate 101 and the substrate 102 respectively.

Note that, the axial direction of the transmission axis T of the polarizer 130 can define the viewing angle control direction of the display device 10 (e.g., parallel to the direction X), and the axial direction of the optical axis n of the liquid crystal layer 110 is perpendicular to the axial direction of the transmission axis T of the polarizer 130 (i.e., the viewing angle control direction). More specifically, the axial direction of the optical axis n of the liquid crystal layer 110 and the axial direction of the absorption axis A of the dye molecules DM are both perpendicular to the axial direction of the transmission axis T of the polarizer 130 (i.e., the viewing angle control direction). Therefore, the liquid crystal layer 110 provided with the dye molecules DM may have a light filtering effect at the side viewing angle in the anti-peeping mode of the display device 10. The sharing mode and the anti-peeping mode of the display device 10 will be illustrated below.

When the display device 10 operates in the sharing mode, as shown in FIG. 2A and FIG. 2B, the electrically controlled viewing angle switching device 100 is not enabled (i.e., no voltage is applied between the first electrode 121 and the second electrode 122). Under the circumstances, the axial direction of the optical axis n of the liquid crystal layer 110 and the axial direction of the absorption axis A of the dye molecules DM are parallel to the surface 130s of the polarizer 130 and perpendicular to the axial direction of the transmission axis T of the polarizer 130. For example, a plurality of unpolarized light from the backlight module 300 passes through the electrically controlled viewing angle switching device 100 to form, for example, light LB1, light LB2, light LB3, light LB4, light LB5, light LB6, and light LB7. Each of the aforementioned light has a first linear polarization P1, and the vertical projection of the polarization direction of the first linear polarization P1 on the surface 130s of the polarizer 130 is parallel to the axial direction of the transmission axis T of the polarizer 130. Therefore, the light having the first linear polarization P1 from the liquid crystal layer 110 can pass through the polarizer 130.

In detail, a light component of the unpolarized light from the backlight module 300 whose electric field polarization direction is not perpendicular to the axial direction of the absorption axis A of the dye molecules DM is absorbed by the dye molecules DM. In other words, only a light component whose electric field polarization direction is perpendicular to the axial direction of the absorption axis A of the dye molecules DM can pass through the dye molecules DM. Therefore, light passing through the liquid crystal layer 110 only has the first linear polarization P1 whose polarization direction is perpendicular to the axial direction of the absorption axis A of the dye molecules DM.

Referring to FIG. 3A and FIG. 3B, when the display device 10 operates in the anti-peeping mode, the electrically controlled viewing angle switching device 100 is enabled (i.e., voltage is applied between the first electrode 121 and the second electrode 122). On this occasion, the axial direction of the optical axis n of the liquid crystal layer 110 and the axial direction of the absorption axis A of the dye molecules DM are perpendicular to the surface 130s of the polarizer 130 and also perpendicular to the axial direction of the transmission axis T of the polarizer 130. A plurality of unpolarized light from the backlight module 300 pass through the electrically controlled viewing angle switching device 100 to form, for example, light LB1', light LB2', light LB3', light LB4', light LB5', light LB6' and light LB7', and most of the aforementioned light has different polarization properties.

For example, after passing through the liquid crystal layer 110, the light LB1' still maintains its non-polarization property. After the light LB2' and the light LB3' pass through the liquid crystal layer 110, the light component of the first linear polarization P1 will be absorbed by the dye molecules DM to form the first linear polarization P1' with less light components (i.e., the first linear polarization P1' has a smaller electric field amplitude than the first linear polarization P1). After the light LB4' and the light LB5' pass through the liquid crystal layer 110, the light component of the first linear polarization P1 is completely absorbed by the dye molecules DM. In other words, on the XZ plane (as shown in FIG. 3A), after light at different incident angles passes through the liquid crystal layer 110, the light components of the first linear polarization P1 of the light are absorbed at different levels. For example, the greater the incident angle of light, the more the light components of the first linear polarization P1 is absorbed by the dye molecules DM, and the light components of the second linear polarization P2 of the light LB1' to LB5' are rarely substantially affected or are not affected.

Note that the degree to which the light component of the first linear polarization P1 is absorbed by the dye molecules DM may depend on the length of the light path of the light in the liquid crystal layer 110. For example, the greater the incident angle, the longer the light path in the liquid crystal layer 110, and therefore the greater the probability of the light component of the first linear polarization P1 being absorbed by the dye molecules DM. Note that a thickness d of the liquid crystal layer 110 or the doping concentration of the dye molecules DM also affects the degree to which the light component of the first linear polarization P1 is absorbed by the dye molecules DM. In an embodiment, the thickness d of the liquid crystal layer 110 may be greater than 8 micrometers, but the disclosure is not limited thereto. Specifically, since the polarization direction of the second linear polarization P2 of the light LB1' to LB5' is perpendicular to the axial direction of the absorption axis A of the dye molecules DM, after the light passes through the liquid crystal layer 110, the light component of the second linear polarization P2 will not be absorbed by the dye molecules DM.

Furthermore, the vertical projections of the polarization directions of the first linear polarization P1 and the first linear polarization P1' on the surface 130s of the polarizer 130 are parallel to the axial direction of the transmission axis T of the polarizer 130. Therefore, the light from the liquid crystal layer 110 (i.e., the light LB1', the light LB2', and the light LB3') can pass through the polarizer 130, and the light component of the second linear polarization P2 is absorbed by the polarizer 130. After passing through the polarizer 130, the light only has the light component of the first linear polarization. Note that the light component of the first linear polarization of the light will decrease as the incident angle (or viewing angle) increases. Accordingly, a light filtering effect at the side viewing angle (or large viewing angle) is achieved. In other words, the electrically controlled viewing angle switching device 100 has the ability to control the light output range (or viewing angle) in the axial direction of the transmission axis T of the polarizer 130 (i.e., the viewing angle control direction). Specifically, when the polarizer 130 is disposed on the light incident surface of the electrically controlled viewing angle switching device 100, the polarizer 130 first filters out the light component of the second linear polarization P2 among the plurality of unpolarized light from the backlight module 300; after the light enters the liquid crystal layer 110, the light component of the first linear polarization will become smaller as the incident angle (or viewing angle) increases. Accordingly, the light filtering effect at the side viewing angle (or large viewing angle) can also be achieved.

On the other hand, as shown in FIG. 3B, after the light LB6' and the light LB7' pass through the liquid crystal layer 110, the light component of the second linear polarization P2 is absorbed by the dye molecules DM to form a second linear polarization P2' with less light component (i.e., the second linear polarization P2' has an electric field amplitude less than that of the second linear polarization P2). That is, on the YZ plane, after light at different incident angles passes through the liquid crystal layer 110, the light component of the second linear polarization P2 is absorbed to different degrees. For example, the larger the incident angle of the light, the more the light component of the second linear polarization P2 of the light is absorbed by the dye molecules DM. Note that, since the polarization direction of the first linear polarization P1 of the light LB6' and the light LB7' is perpendicular to the axial direction of the absorption axis A of the dye molecules DM, after the light passes through the liquid crystal layer 110, the light component of the first linear polarization P1 is not absorbed by the dye molecules DM.

Since the vertical projection of the polarization direction of the first linear polarization P1 on the surface 130s of the polarizer 130 is parallel to the axial direction of the transmission axis T of the polarizer 130, the light from the liquid crystal layer 110 (i.e., the light LB1', the light LB6', and the light LB7') can pass through the polarizer 130, and the light component of the second linear polarization is absorbed by the polarizer 130. After passing through the polarizer 130, the light only has the light component of the first linear polarization P1. Note that the light component of the first linear polarization P1 of the light does not vary with the incident angle (or viewing angle). In other words, the electrically controlled viewing angle switching device 100 does not have the ability to control the viewing angle in an axial direction perpendicular to the transmission axis T of the polarizer 130.

Referring to FIG. 2A and FIG. 3A, when a voltage is applied between the first electrode 121 and the second electrode 122 of the electrically controlled viewing switching device 100, the electrically controlled viewing angle switching device 100 has a first viewing angle range R1 (see FIG. 3A) in the viewing angle control direction (e.g., the axial direction of the transmission axis T of the polarizer 130). When no voltage is applied between the first electrode 121 and the second electrode 122 of the electrically controlled viewing angle switching device 100, the electrically controlled viewing angle switching device 100 has a second viewing angle range R2 (see FIG. 2A) in the viewing angle control direction (e.g., the axial direction of the transmission axis T of the polarizer 130), and the first viewing angle range R1 is smaller than the second viewing angle range R2. That is to say, through the electrical control property of the electrically controlled viewing angle switching device 100, the display device 10 can be more conveniently switched between the sharing mode and the anti-peeping mode. On the other hand, by doping the liquid crystal layer 110 with dye molecules DM and adjusting the axial direction of the absorption axis A of the dye molecules DM in an electrically controlled manner, the light filtering effect of the electrically controlled viewing angle switching device 100 at the side viewing angle can be improved, and thereby the anti-peeping performance of the display device 10 is improved.

Figure 4:
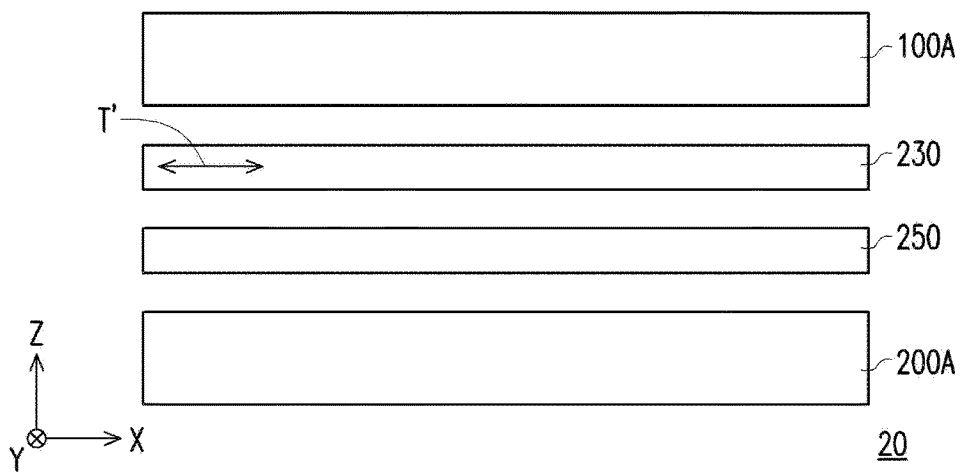
FIG. 4 is a schematic side view of a display device according to another embodiment of the disclosure.
Figure 5:
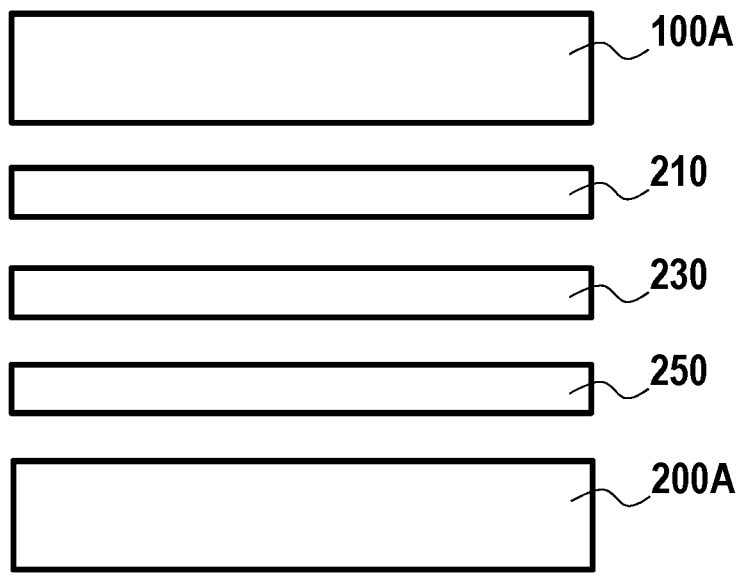
FIG. 5 is a schematic side view of a display device according to still another embodiment of the disclosure.

FIG. 4 is a schematic side view of a display device according to another embodiment of the disclosure. FIG. 5 is a schematic side view of a display device according to still another embodiment of the disclosure. Referring to FIG. 4, the difference between the display device 20 of the embodiment and the display device 10 of FIG. 1 is that the constitution of the display device and the type of display panel are different. Specifically, the display panel 200A of the display device 20 is a self-luminous display panel, such as an organic light-emitting diode (OLED) panel, but it is not limited thereto. In other embodiments, the display panel 200A may also be a micro light-emitting diode (Micro LED) panel or a sub-millimeter light-emitting diode (Mini LED) panel. The electrically controlled viewing angle switching device 100A may be the electrically controlled viewing angle switching device described in the aforementioned embodiments. Furthermore, the electrically controlled viewing angle switching device 100A is disposed on the light exit side of the display panel 200A, and the polarizer 130 (as shown in FIG. 2A) of the electrically controlled viewing angle switching device 100A can be disposed on the light exit surface or light incident surface of the electrically controlled viewing angle switching device 100A. That is, the polarizer 130 may be disposed between the liquid crystal layer 110 and the display panel 200A, or the liquid crystal layer 110 may be disposed between the polarizer 130 and the display panel 200A.

In the embodiment, the display device 20 may also optionally include an auxiliary polarizer 230 and a phase retardation film 250. The phase retardation film 250 is disposed between the electrically controlled viewing angle switching device 100A and the display panel 200A, and the auxiliary polarizer 230 is disposed between the phase retardation film 250 and the electrically controlled viewing angle switching device 100A. For example, the phase retardation film 250 is, for example, a quarter-wave plate, but it is not limited thereto. In other embodiments, the phase retardation of the phase retardation film can also be adjusted according to the actual arrangement position. In the embodiment, the axial direction of the transmission axis T' of the polarizer 130 and the auxiliary polarizer 230 may define the viewing angle control direction (e.g., direction X) of the display device 20.

In the embodiment, the electrically controlled viewing angle switching device 100A is similar to the aforementioned electrically controlled viewing angle switching device 100 (as shown in FIG. 2A and disclosed in other embodiments). Therefore, for detailed description, please refer to the relevant paragraphs of the foregoing embodiments, and it will not be repeated here. In particular, in one embodiment, if the polarizer 130 is disposed on the light incident surface of the electrically controlled viewing angle switching device 100A, then, the auxiliary polarizer 230 disposed between the electrically controlled viewing angle switching device 100A and the phase retardation film 250 can be used to replace the polarizer 130 of the electrically controlled viewing angle switching device 100A. That is, the electrically controlled viewing angle switching device 100A may not have the polarizer 130. In other words, the auxiliary polarizer 230 and the polarizer 130 of the electrically controlled viewing angle switching device 100A may be integrated into a same polarizer. Accordingly, it is possible to increase the design flexibility of the display device having the anti-peeping function.

The disclosure can also add a half-wave plate or a liquid crystal cell (such as TN, VA, ECB, IPS) that can turn the linear polarization state to 90 degrees between the electrically controlled viewing angle switching device 100A and the auxiliary polarizer 230, thereby changing the anti-peeping direction. As illustrated in FIG. 5, a liquid crystal cell 210 may be disposed between the electrically controlled viewing angle switching device 100A and the auxiliary polarizer 230. This configuration can be applied to mobile phones or tablet PCs. When the user rotates the screen from horizontal to vertical direction, the anti-peeping direction can maintain the same direction.

In summary, in the electrically controlled viewing angle switching device and the display device according to embodiments of the disclosure, a plurality of dye molecules are provided in the liquid crystal layer disposed between the first electrode and the second electrode. Both the axial direction of the optical axis of the liquid crystal layer and the axial direction of the absorption axis of the dye molecules are perpendicular to the axial direction of the transmission axis of the polarizer, which can effectively improve the light filtering effect of the electrically controlled viewing angle switching device at the side viewing angle. On the other hand, adjusting the axial direction of the absorption axis A of the dye molecules DM by electrical control can make it more convenient to switch the display device between the sharing mode and the anti-peeping mode.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the disclosure as defined by the following claims. Moreover, no element and component in the disclosure is intended to be dedicated to the public regardless of whether the element or component is explicitly recited in the following claims.

What is claimed is:

1. A display device, wherein the display device comprises a display panel, a liquid crystal cell, an auxiliary polarizer and an electrically controlled viewing angle switching device, wherein
   the electrically controlled viewing angle switching device is stacked on the display panel, the auxiliary polarizer is disposed between the display panel and the electrically controlled viewing angle switching device, the liquid crystal cell is disposed between the auxiliary polarizer and the electrically controlled viewing angle switching device, the liquid crystal cell is configured to turn a linear polarization state of a light to 0 degree or 90 degrees, and the electrically controlled viewing angle switching device comprises a first electrode, a second electrode, a liquid crystal layer, a plurality of dye molecules, and a polarizer, wherein
   the second electrode is disposed opposite to the first electrode;
   the liquid crystal layer is disposed between the first electrode and the second electrode and has an optical axis;
   the plurality of dye molecules are dispersedly disposed in the liquid crystal layer, and each of the dye molecules is disposed corresponding to the optical axis of the liquid crystal layer; and
   the polarizer is stacked on the liquid crystal layer, wherein an axial direction of the optical axis of the liquid crystal layer is perpendicular to an axial direction of a transmission axis of the polarizer.

2. The display device according to claim 1, wherein the display device further comprises a phase retardation film, wherein the display panel is a self-luminous display panel, and the phase retardation film is disposed between the electrically controlled viewing angle switching device and the self-luminous display panel.

3. The display device according to claim 2, wherein the auxiliary polarizer is disposed between the phase retardation film and the electrically controlled viewing angle switching device.

4. The display device according to claim 1, wherein a voltage is applied between the first electrode and the second electrode, and the axial direction of the optical axis of the liquid crystal layer and an axial direction of an absorption axis of the plurality of dye molecules are perpendicular to a surface of the polarizer.

5. The display device according to claim 4, wherein the voltage is not applied between the first electrode and the second electrode, and the axial direction of the optical axis of the liquid crystal layer and the axial direction of the absorption axis of the plurality of dye molecules are parallel to the surface of the polarizer.

6. The display device according to claim 5, wherein when the voltage is applied between the first electrode and the second electrode, the electrically controlled viewing angle switching device has a first viewing angle range; and when the voltage is not applied between the first electrode and the second electrode, the electrically controlled viewing angle switching device has a second viewing angle range that is larger than the first viewing angle range.

7. The display device according to claim 1, wherein the polarizer is disposed between the liquid crystal layer and the display panel.

8. The display device according to claim 1, wherein an axial direction of an absorption axis of the plurality of dye molecules is parallel to the axial direction of the optical axis of the liquid crystal layer.

9. The display device according to claim 1, wherein a thickness of the liquid crystal layer is greater than 8 micrometers.

10. The display device according to claim 1, wherein an axial direction of an absorption axis of the plurality of dye molecules is perpendicular to a viewing angle control direction of the electrically controlled viewing angle switching device.

* * * * *